US008949481B2

(12) United States Patent
Bar-Niv et al.

(10) Patent No.: US 8,949,481 B2
(45) Date of Patent: Feb. 3, 2015

(54) TECHNIQUES FOR ACHIEVING COMPLETE INTEROPERABILITY BETWEEN DIFFERENT TYPES OF MULTIMEDIA DISPLAY INTERFACES

(75) Inventors: Amir Bar-Niv, Sunnyvale, CA (US); Ziv Kabiry, Kfar Saba (IL); Yaron Slezak, Ra'anana (IL)

(73) Assignee: Cadence Design Systems, Inc., San Jose, CA (US)

( * ) Notice: Subject to any disclaimer, the term of this patent is extended or adjusted under 35 U.S.C. 154(b) by 622 days.

(21) Appl. No.: 12/558,673

(22) Filed: Sep. 14, 2009

(65) Prior Publication Data

US 2011/0063501 A1 Mar. 17, 2011

(51) Int. Cl.
*G06F 3/00* (2006.01)
*H04N 5/38* (2006.01)
*G09G 5/00* (2006.01)

(52) U.S. Cl.
CPC ............ *G09G 5/006* (2013.01); *G09G 2370/10* (2013.01); *G09G 2370/12* (2013.01)
USPC ............................................ 710/16; 348/723

(58) Field of Classification Search
CPC .............................. G06F 13/385; H01R 13/00
USPC ........................................................... 710/16
See application file for complete search history.

(56) References Cited

U.S. PATENT DOCUMENTS

| | | | | |
|---|---|---|---|---|
| 7,572,143 | B2 | 8/2009 | Harris | |
| 7,611,367 | B2 | 11/2009 | Lee | |
| 7,677,925 | B2 | 3/2010 | Chuang | |
| 7,788,412 | B2 | 8/2010 | Guo | |
| 7,835,382 | B2 | 11/2010 | Lida | |
| 7,918,689 | B2 | 4/2011 | Sloey et al. | |
| 8,200,855 | B2 * | 6/2012 | Goodart et al. | 710/15 |
| 8,242,803 | B2 * | 8/2012 | Wu et al. | 326/30 |
| 2002/0038432 | A1 | 3/2002 | Hsu | |
| 2008/0201756 | A1 | 8/2008 | Shakiba et al. | |
| 2008/0205519 | A1 | 8/2008 | Goodart et al. | |
| 2008/0298504 | A1 * | 12/2008 | Lee et al. | 375/316 |
| 2009/0074040 | A1 | 3/2009 | Lida | |
| 2009/0115911 | A1 | 5/2009 | Lida et al. | |
| 2009/0116547 | A1 | 5/2009 | Lida et al. | |
| 2009/0116548 | A1 | 5/2009 | Lida et al. | |

(Continued)

OTHER PUBLICATIONS

United States Office Action of U.S. Appl. No. 13/312,457 dated Jun. 21, 2013.

(Continued)

*Primary Examiner* — Titus Wong
(74) *Attorney, Agent, or Firm* — Pearl Cohen Zedek Latzer Baratz LLP

(57) ABSTRACT

A multimedia interface cable for achieving complete interoperability between different types of multimedia display interfaces. The cable comprises a first multimedia connector including a plurality of contact pins of at least high-speed multimedia signals and control signals; a second multimedia connector including a plurality of contact pins of least high-speed multimedia signals and control signals; a plurality of un-crossing conducting wires for coupling the plurality of contact pins of the high-speed multimedia signals in the first multimedia connector to the plurality of contact pins of the high-speed multimedia signals in the second multimedia connector; and a plurality of conducting wires for coupling the plurality of contact pins of the control signals in the first multimedia connector to the plurality of contact pins of the control signals in the second multimedia connector.

20 Claims, 4 Drawing Sheets

(56) References Cited

U.S. PATENT DOCUMENTS

| | | | | |
|---|---|---|---|---|
| 2009/0116583 | A1 | 5/2009 | Lida et al. | |
| 2009/0142969 | A1* | 6/2009 | Chuang | 439/709 |
| 2009/0147864 | A1 | 6/2009 | Lida et al. | |
| 2009/0177901 | A1 | 7/2009 | Chen | |
| 2009/0179883 | A1* | 7/2009 | Goodart et al. | 345/211 |
| 2009/0231485 | A1 | 9/2009 | Steinke | |
| 2009/0300243 | A1 | 12/2009 | Chao | |
| 2010/0079475 | A1* | 4/2010 | Whitby-Strevens et al. | 345/559 |
| 2010/0128182 | A1* | 5/2010 | Ichimura et al. | 348/723 |
| 2010/0268860 | A1* | 10/2010 | Nikazm et al. | 710/105 |
| 2010/0328540 | A1* | 12/2010 | Wu et al. | 348/723 |
| 2011/0093623 | A1 | 4/2011 | Chen | |
| 2011/0167176 | A1 | 7/2011 | Yew | |
| 2012/0076296 | A1 | 3/2012 | Graunke | |
| 2012/0196475 | A1 | 8/2012 | Lin | |
| 2012/0320546 | A1 | 12/2012 | Wu | |

OTHER PUBLICATIONS

United States Final Office Action of U.S. Appl. No. 13/312,457 dated Feb. 26, 2014.

United States Office Action of U.S. Appl. No. 13/852,559 dated May 22, 2014.

United States Office Action of U.S. Appl. No. 13/312,514 dated May 8, 2013.

United States Final Office Action of U.S. Appl. No. 13/312,514 dated Jan. 2, 2014.

* cited by examiner

TECHNIQUES FOR ACHIEVING COMPLETE INTEROPERABILITY BETWEEN DIFFERENT TYPES OF MULTIMEDIA DISPLAY INTERFACES

TECHNICAL FIELD

This invention generally relates to the connectivity of electronic display devices.

BACKGROUND OF THE INVENTION

The high-definition multimedia interface (HDMI) is a compact audio/video connector interface for transmitting uncompressed digital streams. The HDMI connects a digital multimedia (or audio/video) source (e.g., a set-top box, a DVD player, a personal computer, a video game console, etc.) to a compatible digital sink, such as a digital television. The HDMI is fully described in the HDMI Specification version 1.4 published on Jun. 5, 2009, incorporated herein by reference in its entirety merely for the useful understanding of the background of the invention.

A HDMI cable is a transport medium including three transition minimized differential signaling (TMDS®) channels utilized to transfer video, audio, and auxiliary data encapsulated in TDMS characters and the transmission is synchronized using a high-frequency clock signal running over a clock channel. The TDMS and clock channels are differential pairs. A HDMI cable also includes the following channels: a display data channel (DDC_SCL and DDC_SDA), a consumer electronics control (CEC), and a hot-plug detect (HPD) signal which originates at the sink. The HDMI interface is implemented using a HDMI cable and connectors, each of which includes 19 pins. A source and sink connectors have the same configuration. Table 1 lists the pins in a type A HDMI connector (either a source or sink).

TABLE 1

| Pin Number | HDMI Signal |
|---|---|
| 1. | TMDS_Data2+ |
| 2. | Shield |
| 3. | TMDS_Data2− |
| 4. | TMDS_Data1+ |
| 5. | Shield |
| 6. | TMDS_Data1− |
| 7. | TMDS_Data0+ |
| 8. | Shield |
| 9. | TMDS_Data0− |
| 10. | TMDS_Clk+ |
| 11. | Shield |
| 12. | TMDS_Clk− |
| 13. | CEC |
| 14. | Utility |
| 15. | SCL |
| 16. | SDA |
| 17. | DDC/CEC/Ground |
| 18. | +5 V |
| 19. | HPD |

DisplayPort™ is a standard that defines a digital display interface of a new digital audio/video interconnect. The DisplayPort is intended to be used primarily between a computer and its display monitor, or a computer and a home-theater system. The DisplayPort standard is fully described in the DisplayPort Specification Version 1.1a published in Jan. 11, 2008, by the video electronics standards association (VESA), incorporated herein by reference in its entirety merely for the useful understanding of the background of the invention.

Transport channels of a DisplayPort interface include a main link, an auxiliary (AUX), and a hot plug detect (HPD). The main link is a unidirectional channel that allows data transfers over up to 4 lanes that carry clock signals in addition to the video/audio streams. Each lane is an AC-coupled differential pair. The auxiliary channel is a bi-directional half-duplex channel that carries control and management information and the HPD channel is used by a sink device to interrupt a source device when a plug is connected or disconnected. The DisplayPort interface is facilitated using a proprietary cable and connectors, each of which includes 20 pins. The DisplayPort cable is a cross cable, i.e., a source and sink connector has a different configuration. Table 2 lists the pins and their signals of source and sink DisplayPort connectors.

TABLE 2

| Pin Number | DisplayPort Sink | DisplayPort source |
|---|---|---|
| 1. | ML_lane0P | ML_lane3N |
| 2. | GND | GND |
| 3. | ML_lane0N | ML_lane3P |
| 4. | ML_lane1P | ML_lane2N |
| 5. | GND | GND |
| 6. | ML_lane1N | ML_lane2P |
| 7. | ML_lane2P | ML_lane1N |
| 8. | GND | GND |
| 9. | ML_lane2N | ML_lane1P |
| 10. | ML_lane3P | ML_lane0N |
| 11. | GND | GND |
| 12. | ML_lane3N | ML_lane0P |
| 13. | Config1 | Config1 |
| 14. | Config2 | Config2 |
| 15. | AUX_CHP | AUX_CHP |
| 16. | GND | GND |
| 17. | AUX_CHN | AUX_CHN |
| 18. | HPD | HPD |
| 19. | Return | Return |
| 20. | AUX_PWR | AUX_PWR |

Multimedia interfaces that allow connectivity of both the HDMI and DisplayPort (will be referred hereinafter as a "dual mode connectivity interface") have been recently developed. Specifically, such interfaces can process data compliant with the HDMI and DisplayPort. However, even if a source or sink device has dual-mode connectivity capabilities, the connection is either through a HDMI or a DisplayPort connector. In the related art there is no physical medium (e.g., a cable), other than HDMI or DisplayPort cables, to connect source and sink devices having different connector types.

Interoperability between HDMI and DisplayPort is defined in the VESA DisplayPort Interoperability Guideline Version 1.1a published on Feb. 5, 2009, which requires a dedicated adapter and a HDMI cable. As illustrated in FIG. 1A, a source device 110 including a dual mode connectivity interface and a DisplayPort connector 160 is connected using an adapter 130 and a HDMI cable 120 to a sink device 140 having a HDMI connector 150. Similar configuration, shown in FIG. 1B, is applied when the sink device 140 includes a dual mode connectivity interface and is connected through the DP connector 160 and an adapter 170 to the source device 110 having a HDMI connector 150. This is the only available interoperability configuration that allows a reliable connection between a HDMI compliant source/sink to a DisplayPort dual mode connectivity sink/source. For example, there is no solution for connecting a dual mode connectivity sink/source device having a HDMI connector to a source/sink device with a DisplayPort connector. That is, currently there is no known technique to support complete interoperability at least between HDMI and DisplayPort multimedia interfaces.

SUMMARY OF THE INVENTION

Certain embodiments of the invention include multimedia interface cable. The multimedia comprises a first multimedia connector including a plurality of contact pins of at least high-speed multimedia signals and control signals; a second multimedia connector including a plurality of contact pins of least high-speed multimedia signals and control signals; a plurality of un-crossing conducting wires for coupling the plurality of contact pins of the high-speed multimedia signals in the first multimedia connector to the plurality of contact pins of the high-speed multimedia signals in the second multimedia connector; and a plurality of conducting wires for coupling the plurality of contact pins of the control signals in the first multimedia connector to the plurality of contact pins of the control signals in the second multimedia connector.

Certain embodiments of the invention further include an apparatus for enabling interoperability between multimedia display interfaces, the apparatus is operable in a source multimedia device. The apparatus comprises an input coupled to a multimedia connector; and a comparator for determining a type of the multimedia display interface of a sink multimedia device connected to the source multimedia device based on at least a voltage level of a clock signal received through the multimedia connector.

Certain embodiments of the invention also include an apparatus for enabling interoperability between multimedia display interfaces, the apparatus is operable in a sink multimedia device. The apparatus comprises an input interface coupled to a multimedia connector; and a detector for determining a type of the multimedia display interface of a source multimedia device connected to the sink multimedia device based on at least one control signal received through the multimedia connector.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION OF THE INVENTION

Figure 1A:
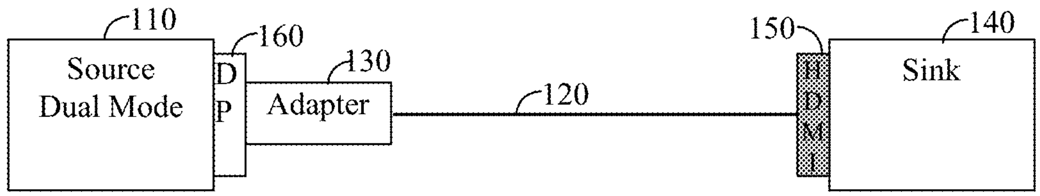
FIGS. 1A and 1B are diagrams illustrating the connection between a HDMI device and a DisplayPort device using an adapter.
Figure 1B:
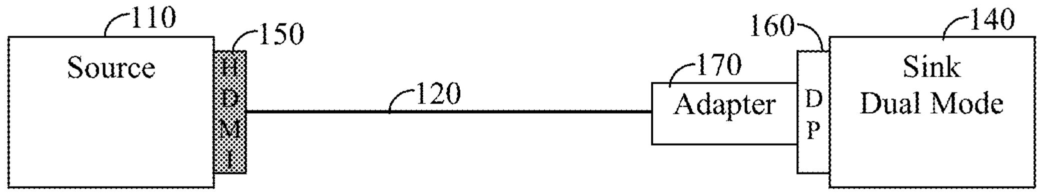

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 2A:
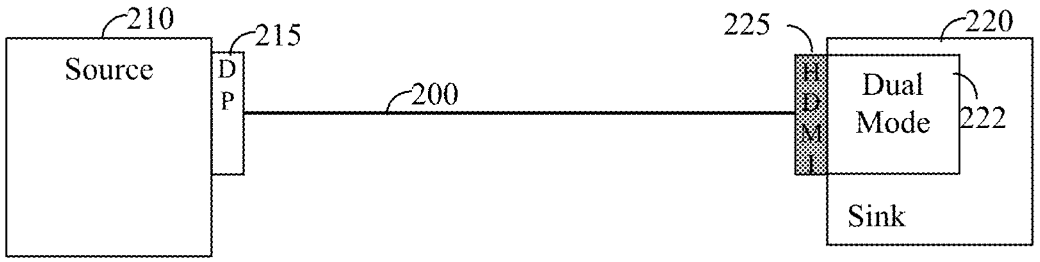
FIGS. 2A and 2B are schematic diagrams illustrating the connection between a HDMI device and a DisplayPort device using a cable designed in accordance with the principles of the invention.
Figure 2B:
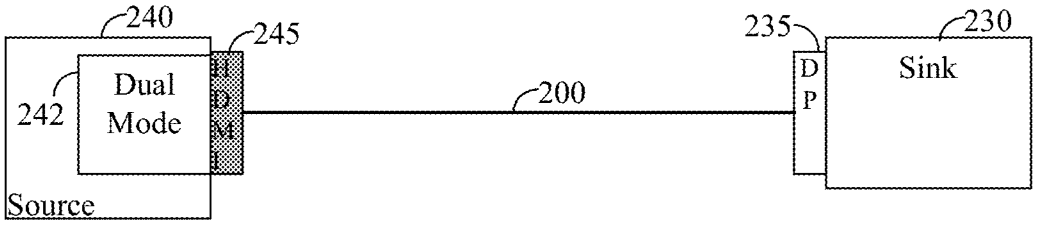

One embodiment of the invention, illustrated in FIG. 2A, includes a multimedia interface cable 200 that enables a proper connection between a DisplayPort compliant source device 210 and a HDMI compliant sink device 220 that includes a dual mode connectivity interface 222. The devices 210 and 220 respectively include a DisplayPort and HDMI connector 215 and 225. As shown in FIG. 2B, the cable 200 can be also utilized to connect a DisplayPort compliant sink device 230 to a HDMI compliant source device 240 that includes a dual mode connectivity interface 242. The devices 230 and 240 respectively include a DisplayPort and HDMI connector 235 and 245.

In accordance with an embodiment of the invention both dual mode connectivity interfaces 222 and 242 implement an automatic recognition technique for determining the type of the multimedia interface (e.g., a HDMI or DisplayPort) connected at the other end of the cable 200, and configuring the respective device accordingly. For example, if the source device 210 also supports a HDMI, the dual mode connectivity interface 222 recognizes that HDMI data is transmitted by the source device 210, and sets the sink device 220 to process such type of data. As will be described in detail below, each of the dual mode connectivity interfaces implement a different automatic recognition technique.

Figure 3:
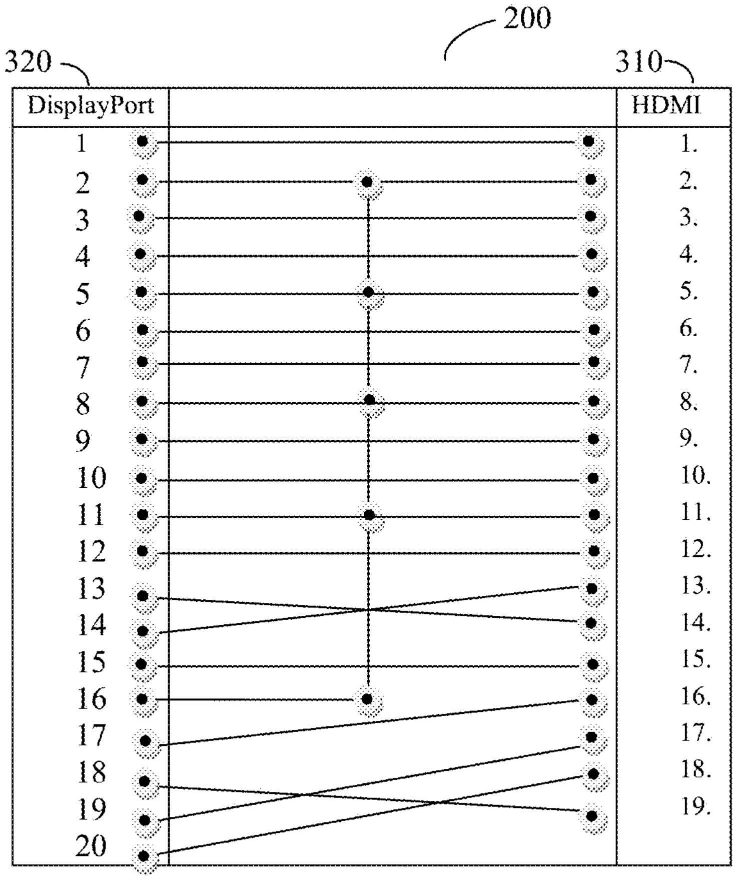
FIG. 3 is a schematic diagram of a multimedia interface cable constructed in accordance with an embodiment of the invention.

FIG. 3 is an exemplary diagram of the multimedia interface cable 200 wired according to an embodiment of the invention. The cable 200 provides a transport medium between two different types of multimedia interfaces. In one embodiment the multimedia interfaces include, but are not limited to, the HDMI and DisplayPort. Without departing from the scope of the invention the structure of the cable will be described hereinafter with a reference to this embodiment.

The multimedia interface cable 200 comprises a HDMI connector 310 including 19 pins and a DisplayPort connector 320 with 20 pins. The wiring between the connectors 310 and 320 is depicted in FIG. 3. It is important to note that in order to ensure good performance no transport data channels (e.g., TDMS and main lane channels) are crossed. As listed in Table 2 above, the wires between a source DisplayPort connector and a sink DisplayPort connector are crossed. For example, pin 1 on a source DisplayPort connector is main Lane 3, while on the sink connector this pin is main Lane 0. This does not affect the wiring of the cable 200, however, the signals are swapped by, for example, the dual mode connectivity interface to ensure proper connection. In accordance with an exemplary embodiment of the invention, the switching of the signals is performed as described in U.S. patent application Ser. No. 12/260,419 to Bar-Niv, assigned to the common assignee, and incorporated herein by reference.

To allow proper connection, such as the configuration illustrated in FIG. 2A, DisplayPort Lane 0 (e.g., pins 1 and 3 on connector 320) is connected to TDMS channel 2 (e.g., pins 1 and 3 on connector 310); Lane 1 (e.g., pins 4 and 6 on connector 320) to TDMS channel 1 (e.g., pins 4 and 6 connector 310); Lane 2 (e.g., pins 7 and 9 on connector 320) is connected to TDMS channel 0 (e.g., pins 7 and 9 on connector 310); and Lane 3 (e.g., pins 10 and 12 on connector 320) is connected to the clock channel (e.g., pins 10 and 12 on connector 310).

To allow a proper connection between a source HDMI (dual mode) and a sink DisplayPort, such as the configuration illustrated in FIG. 2B, DisplayPort Lane 3 (e.g., pins 1 and 3 on connector 320) is connected to TDMS channel 2 (e.g., pins 1 and 3 on connector 310); Lane 2 (e.g., pins 4 and 6 on connector 320) to TDMS channel 1 (e.g., pins 4 and 6 connector 310); Lane 1 (e.g., pins 7 and 9 on the connector 320) is connected to TDMS channel 0 (e.g., pins 7 and 9 on connector 310); and Lane 0 (e.g., pins 10 and 12 on connector 320) is connected to the clock channel (e.g., pins 10 and 12 on connector 310). In addition, a polarity inverter is utilized on each of the TDMS and clock channels.

Control signals (in the configurations depicted both in FIGS. 2A and 2B) are wired as described in the VESA standard referenced above. Specifically, as illustrated in FIG. 3 the following pins are wired together: Config1 (e.g., pin 13 on connector 320) and Utility (e.g., pin 14 on connector 310); Config2 (e.g., pin 14 on connector 320) and CEC (e.g., pin 13 on connector 310); AUX_CHP (e.g., pin 15 on connector 320) and SCL (e.g., pin 15 on connector 310); AUX_CHN (e.g., pin 17 on connector 320) and SDA (e.g., pin 16 on connector 310); HPD (e.g., pin 18 on connector 320) and HDP (e.g., pin 19 on connector 310); Return (e.g., pin 19 on connector 320) and DDC (e.g., pin 17 on connector 310); and AUX_PWR (e.g., pin 20 on connector 320) and +5V (e.g., pin 18 on connector 310). The indicated pin numbers are only examples used for ease of understanding. One of ordinary skill in the art recognizes that the pin assignments may be designed to be in any location based on design expediency.

Figure 4:
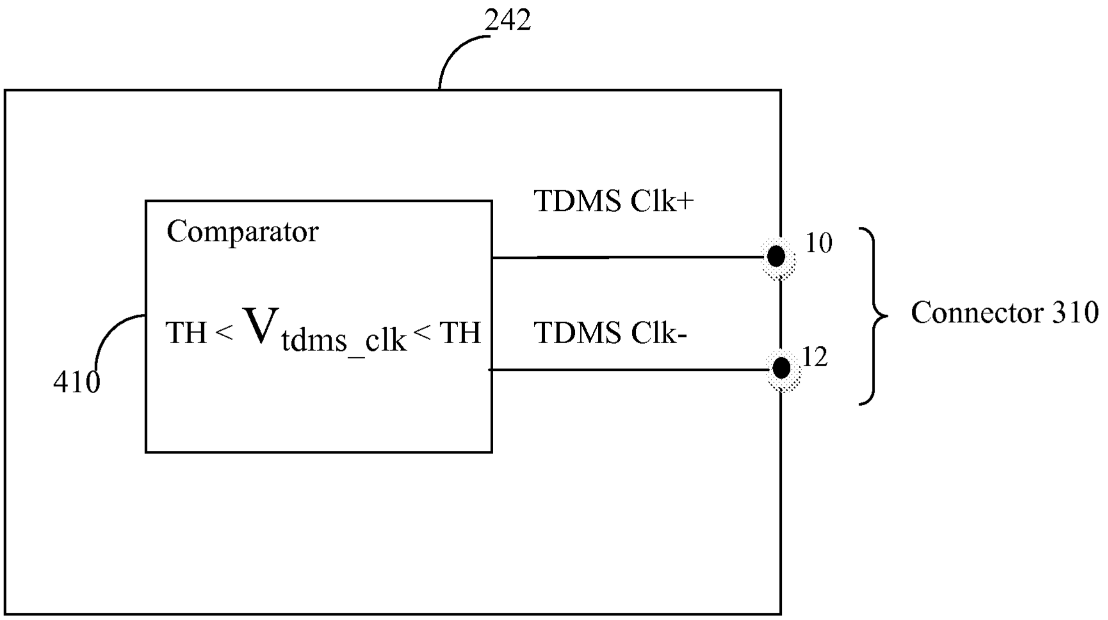
FIG. 4 is a schematic diagram of a source dual mode connectivity interface adapted to perform sink recognition in accordance with an embodiment of the invention.

FIG. 4 shows an exemplary diagram of a source dual mode connectivity interface 242 adapted to automatically recognize a type of a sink multimedia interface connected to the interface 242. The sink recognition technique is performed by a voltage comparator 410 that compares the voltage level on the TMDS clock channel (e.g., pins 10 and 11 on connector 310) to a predefined threshold (TH). Specifically, if the voltage level of the TDMS clock (Vtdms_clk) signal is above 3 volts (V) the sink device is of a HDMI type; if the value of Vtdms_clk's values is between 1.6V and 2V, the sink is of a DisplayPort type; and when the Vtdms_clk is below 1.6V a sink device is off or not connected. It should be noted that the sink recognition can be performed when a HDP signal is inactive, when no data is transferred on the HDMI channels, or when a +5V/DP_PWR signal (e.g., pin 18 on connector 310) is too low. The indicated voltage values of the predefined threshold are only examples used for ease of understanding. One of ordinary skill in the art recognizes that the value may be designed to be any value based on design expediency.

Upon recognition of the type of the sink, the source dual mode connectivity interface 242 is set to be compliant with the multimedia interface type of the sink device. This includes, for example, setting analog circuits of an analog front-end (not shown) of the interface 242 to a mode of operation compliant with the type of the sink, setting the power level of the interface 242 and adapting passive components of control signals by, for example, disabling the AC component of AUX channel and enabling a CEC signal when setting the interface 242 to operate in a HDMI mode.

Figure 5:
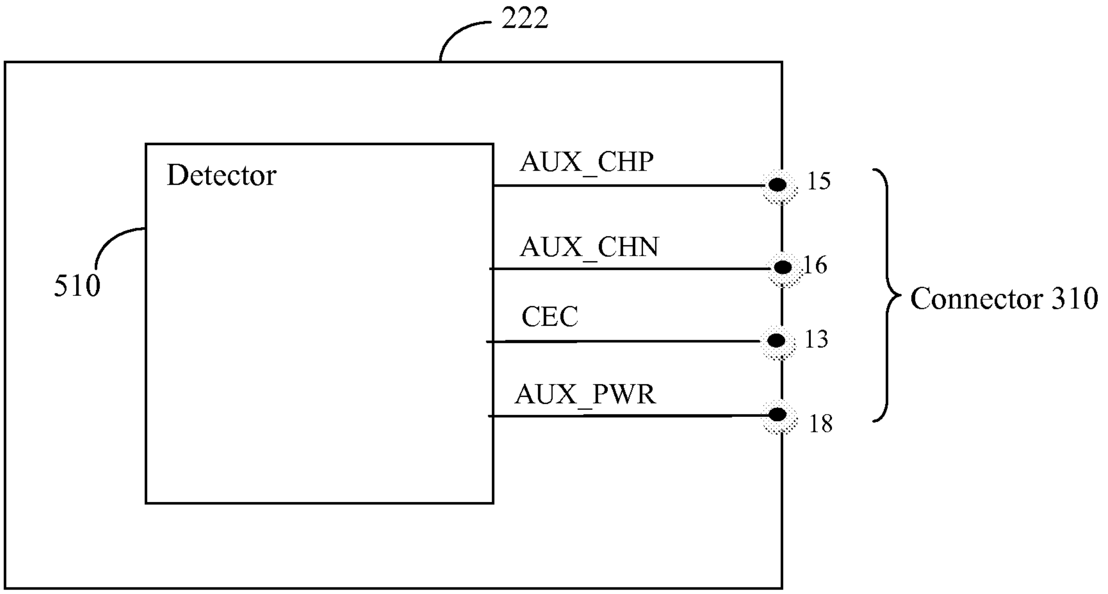
FIG. 5 is a schematic diagram of a sink dual mode connectivity interface adapted to perform source recognition in accordance with an embodiment of the invention.

FIG. 5 shows an exemplary diagram of a sink dual mode connectivity interface 222 adapted to automatically recognize a type of a source multimedia interface connected to the interface 222. The source recognition technique is performed by a detector 510, which may detect the type of the source based on at least one of the following techniques: sensing of an auxiliary channel, sensing of a CEC signal, or by comparing the voltage level of an auxiliary power (AUX_PWR) signal to a predefined threshold.

The detector 510 implements the sensing of an auxiliary channel using a logic circuit (not shown) that generates a decision regarding the type of a source device based on the logic values of the signals AUX_CHP and AUX_CHN (e.g., pins 15 and 16 on connector 310). Specifically, if a logic value of both signals AUX_CHP and AUX_CHN is '0', the source device is a DisplayPort device not being powered; if the value of AUX_CHP is '0' and the value of the AUX_CHN is '1' the source is a DisplayPort device; if the logic values of AUX_CHP and AUX_CHN are '1' and '0' respectively, no device is connected at the other end of the cable; and if a logic value of both AUX_CHP and AUX_CHN is '1', the source is a HDMI device.

In another embodiment the detector 510 senses the CEC and AUX_PWR signals using a logic circuit (not shown) to determine the type of a source device according to logic values of the CEC signal (e.g., pin 13 on connector 310) and the AUX_PWR signal (e.g., pin 18 on connector 310). Specifically, if logic values of both CEC and AUX_PWR signals are '1', the source is a HDMI device not being powered; if the logic values of AUX_PWR and CEC signals are '1' and '0' respectively, the source is a DisplayPort device; and if the value of AUX_PWR is '0', no device is connected at the other end of the cable.

Yet in another embodiment the detector 510 includes a comparator (not shown) that compares the voltage level on an AUX_PWR signal (e.g., pin 18 on connector 310) to a predefined threshold. Specifically, if the voltage level of the AUX_PWR is below 0.8V, no device is connected at the source; if the voltage level of the AUX_PWR signal is between 3V and 4V, the source is a DisplayPort device; and when the amplitude of AUX_PWR is above 4.5V the source is a HDMI device. It should be noted that the logic values '1' and '0' may also be referred to as high and low values respectively. Furthermore, the indicated logic values of '1' and '0' and voltage values of the predefined threshold are only examples used for ease of understanding. One of ordinary skill in the art recognizes that the value may be designed to be any value based on design expediency.

Upon recognition of the type of a source device, the sink dual mode connectivity interface 222 is set to be compliant with the multimedia interface type of the source device. This includes, for example, setting analog circuits of an analog front-end of the interface 222 to a mode of operation compliant with the source device.

It should be appreciated that the multimedia interface cable 200 together with the automatic sensing techniques implemented between the dual mode connectivity interfaces 222 and 242 provide complete interoperability of at least HDMI and DisplayPort. Specifically, the teachings of the invention disclosed herein can be utilized to connect a DisplayPort compliant source device to a HDMI compliant sink device and a HDMI compliant source device to a DisplayPort compliant sink device using either the cable 200 or a standard HDMI cable without using any dedicated adapter, such as described in the VESA standard referenced above or any other type of an active adapter.

Furthermore, connections such as those illustrated in FIGS. 2A and 2B may be achieved using a standard HDMI or DisplayPort cable and a passive adapter connected at one end of the standard cable. The passive adapter is merely a connector compatible with the connector type at the end device. For example, the connection between the sink device 230 and the source device 240 can be achieved using a DisplayPort cable with a passive adapter connected to the HDMI connector 245. The passive adapter does not alert the signals, but rather ensures that a connector of the DisplayPort cable can be mechanically connected to the HDMI connector 245. As another example, the connection between the sink device 220 and the source device 210 can be achieved using a HDMI cable with a passive adapter connected to the DisplayPort connector 215. The passive adapter does not alert the signals, but rather ensures that a connector of the HDMI cable can be mechanically connected to the DisplayPort connector 215. In both configurations the respective dual mode connectivity interface recognizes the type of the device connected at the other end of the cable and processes the multimedia and control signals according to the recognized type of device.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto. All examples and conditional language recited herein are intended for pedagogical purposes to aid the reader in understanding the principles of the invention and the concepts contributed by the inventors to furthering the art, and are to be construed as being without limitation to such specifically recited examples and conditions.

The invention claimed is:

1. An apparatus for enabling HDMI and DisplayPort interoperability between a source multimedia display interface of a source multimedia device and a sink multimedia display interface of a sink multimedia device, wherein the apparatus is located in and operable in the source multimedia device, comprising:

an input coupled to a multimedia connector, wherein the multimedia connector is an HDMI or DisplayPort connector; and a comparator for determining a type of the multimedia display interface of the sink multimedia device connected to the source multimedia device based on at least a voltage level of a transition minimized differential signaling (TMDS) clock signal received through the multimedia connector, wherein the determined type of the multimedia display interface is HDMI or DisplayPort, and wherein the comparator sets the source multimedia device to operate in a mode compliant with the multimedia interface of the sink device.

2. The apparatus of claim 1, wherein the multimedia connector is at least a HDMI connector.

3. The apparatus of claim 1, wherein the comparator is further configured to:

compare the voltage level of the TMDS clock signal to a first predefined threshold and determine the type of the sink multimedia device to be HDMI if the voltage level is above the first predefined threshold; and check if the voltage level of the TMDS clock signal is within a range of a second predefined threshold and determine the type of the sink multimedia device to be DisplayPort if the voltage level is within the range of the second predefined threshold.

4. The apparatus of claim 3, wherein the value of the first threshold is 3 volts and the value of the second threshold is between 1.6 volts and 2 volts.

5. The apparatus of claim 1, further comprising: a switch connected between the multimedia connector and the input interface, wherein the switch is capable of swapping input signals.

6. The apparatus of claim 1, wherein the sink device and the source device are connected using a HDMI cable and a passive adapter connected at one end of the HDMI cable.

7. The apparatus of claim 1, wherein the sink device and the source device are connected using a DisplayPort cable and a passive adapter connected at one end of the DisplayPort cable.

8. An apparatus for enabling HDMI and DisplayPort interoperability between a source multimedia display interface of a source multimedia display device and a sink multimedia display interface of a sink multimedia device located and operable in the sink multimedia device, comprising:

an input interface coupled to a multimedia connector, wherein the multimedia connector is an HDMI or DisplayPort connector; and a detector for determining a type of the multimedia display interface of the source multimedia device connected to the sink multimedia device based on at least one control signal received through the multimedia connector, wherein the type of the multimedia display interface is HDMI or DisplayPort and is determined based on at least one of the following: sensing of an auxiliary channel, sensing of a consumer electronics control (CEC) signal, or sensing a voltage level of an auxiliary power (AUX_PWR) signal, and wherein the detector is to set the sink multimedia device to operate in a mode compliant with the source multimedia interface.

9. The apparatus of claim 8, wherein the multimedia connector is at least a HDMI connector.

10. The apparatus of claim 8, wherein the detector is configured to determine a type of the multimedia display interface based on sensing of an auxiliary channel by:

making a determination based on logic values of an auxiliary channel positive (AUX_CHP) signal and an auxiliary channel negative (AUX_CHN) signal;

wherein when the logic values of the AUX_CHP and AUX_CHN signals are high, the type of the sink multimedia device is HDMI, and when the logic value of the AUX_CHP is low and the logic value of the AUX_CHN signal is high, the type of the sink multimedia device is DisplayPort.

11. The apparatus of claim 8, wherein the detector is configured to determine a type of the multimedia display interface based on sensing a CEC signal by:

making a determination based on the logic values of 5V Power/DP_PWR signal and the CEC signal;

wherein when the logic value of the AUX_PWR and CEC signals are high, the type of the sink multimedia device is HDMI;

and when the logic value of the AUX_PWR is high and the logic value of the CEC signal is low, the type of the sink multimedia device is DisplayPort.

12. The apparatus of claim 8, wherein the detector is configured to determine a type of the multimedia display interface based on sensing a voltage level of an AUX_PWR signal by:

comparing the voltage level of the AUX_PWR signal to a first predefined threshold and determine the type of the sink multimedia device to be HDMI if the voltage level is above the first predefined threshold; and checking if the voltage level of the AUX_PWR signal is within a range of a second predefined threshold and determining the type of the sink multimedia device to be DisplayPort if the voltage level is within the range of the second predefined threshold.

13. The apparatus of claim 10, wherein the value of the first predefined threshold is 4.5 volts and the value of the second predefined threshold is between 3 volts and 4 volts.

14. The apparatus of claim 8, further comprising: a switch connected between the input interface and the multimedia connector, wherein the switch swaps input signals.

15. The apparatus of claim 8, wherein the sink device and the source device are connected using a HDMI cable and a passive adapter connected at one end of the HDMI cable.

16. The apparatus of claim 8, wherein the sink device and the source device are connected using a DisplayPort cable and a passive adapter connected at one end of the DisplayPort cable.

17. A method for enabling HDMI and DisplayPort interoperability between a source multimedia display interface of a source multimedia device and a sink multimedia display interface of a sink multimedia device located in and operable in the source multimedia device, comprising:

receiving control signals through a multimedia connector, wherein the multimedia connector is an HDMI or DisplayPort connector;

recognizing, by the source multimedia device, a type of the multimedia display interface of the sink multimedia device connected to the source multimedia device via a multimedia connector, based on at least one of the following: sensing of an auxiliary channel, sensing of a consumer electronics control (CEC) signal, or sensing a voltage level of an auxiliary power (AUX_PWR) signal; and setting the source multimedia device to operate in a mode compliant with the multimedia display interface of the sink multimedia device.

18. The method of claim 17, wherein the type of the multimedia display interface of the source multimedia device and the sink multimedia device is any of: HDMI and DisplayPort.

19. The method of claim 17, wherein recognizing the type of the multimedia display interface comprises:

comparing a voltage level of a transition minimized differential signaling TMDS clock signal to predefined thresholds; and based on the comparison determining the type of the multimedia display interface of the sink device.

20. The method of claim 17, wherein recognizing the type of the multimedia display interface comprises: comparing a voltage level of at least one control signal to predefined thresholds; and based on the comparison determining the type of the multimedia display interface of the source device.

* * * * *